June 4, 1974  G. HIRS  3,814,688

LIQUID FILTER APPARATUS

Filed Aug. 30, 1972

United States Patent Office 3,814,688
Patented June 4, 1974

---

3,814,688
LIQUID FILTER APPARATUS
Gene Hirs, Birmingham, Mich., assignor to Hydromation Filter Company, Livonia, Mich.
Filed Aug. 30, 1972, Ser. No. 284,818
Int. Cl. B01d 29/02
U.S. Cl. 210—297         3 Claims

ABSTRACT OF THE DISCLOSURE

A liquid filtering apparatus, wherein the contaminant liquid is introduced between opposed, planar, horizontal filter media and flows simultaneously through the opposed media to accrete the contaminants on the confronting faces of the media. The filter media are cleaned by interrupting the flow of contaminant liquid and backwashing the upper filter to collect the contaminants on the lower filter media only. The lower filter is then removed and discarded with all of the contaminants thereon.

The apparatus includes three chambers. A fixed planar filter media is secured between the upper and medial chambers and a removable, disposable filter media is disposed between the medial and lower chambers. The removable filter medium is supported on a continuous conveyor and the medial and lower chambers are separable to remove the disposable filter medium and the contaminants previously collected on both filter media.

BACKGROUND OF THE INVENTION

Those familiar with the filtration art agree that pressure filters which utilize multiple, tubular filter septa provide greater usable filter area for a given volume of pressure vessel. The operators of tube filters are, however, faced with a costly maintenance problem. The particulate contaminants become firmly lodged in the interstices of the filter septa, even after repeated backwashings. The recurrence of such clogging depends upon the type of material being filtered from a liquid solution and the filter medium. This problem is particularly troublesome for example in filtration systems utilized in recirculating spray paint operations and other applications wherein a finely divided solid is to be filtered from a liquid.

When the filter septa becomes clogged with particulate material and backwashing is no longer an effective cleaning method, the filter septa must be mechanically cleaned. Generally, this is a hand operation. Tube filters or similar filters of the type disclosed in my U.S. Pat. No. 2,969,148 require a major dismantling operation before the filter media can be exposed and mechanically scrubbed and cleaned. The extensive labor involved in such dismantling makes this cleaning operation a costly maintenance problem.

Filters of the type disclosed in my U.S. Pat. No. 2,867,326 present no maintenance problem with regard to clogging filter media because such filter media are automatically replaced according to a programmed cycle. The single, planar filter medium of this type of apparatus does not however provide as much usable filter media area for a given pressure volume as tube filters. The disclosed filter apparatus of this invention doubles the usable filter area of planar filters, without substantially increasing the pressure vessel volume.

SUMMARY OF THE INVENTION

The liquid filter apparatus of this invention combines the advantages of the disposable filter medium and conveyor disclosed in my above referenced U.S. Pat. No. 2,867,326, and the increased filter area available only in tubular filters, such as disclosed in my U.S. Pat. No. 2,969,148. The improved apparatus combines a fixed planar filter medium with a replaceable filter medium, wherein the contaminants collected on the fixed medium are transferred to the replaceable medium during backwashing. The contaminant fluid flows simultaneously through both of the filter media during filtering, doubling the usable filter area.

The disclosed liquid filter apparatus includes a plurality of juxtaposed, horizontal chamber sections, including upper and lower end outlet chambers for filtrate liquid and a medial inlet chamber for contaminant liquid, interposed between the upper and lower chambers and in fluid communication therewith. A fixed liquid permeable planar filter medium is interposed between the upper end chamber and the medial chamber and a removable liquid permeable planar filter medium is interposed between the medial chamber and the lower end chamber. The contaminant liquid is introduced, under pressure, into the medial chamber and flows through the opposed filter media accreting contaminants simultaneously on the opposed, confronting, spaced surfaces of the filter media.

The upper filter medium is renewed by backwashing liquid under pressure through the upper filter, transferring the contaminants collected thereon to the opposed face of the disposable filter medium. In the preferred embodiment of the filter apparatus, the medial filter chamber is separable from the lower filter chamber and the disposable filter medium is supported on a continuous conveyor, permitting easy removal of the disposable filter, which includes all of the contaminants after backwashing.

The disclosed embodiment includes a means for interrupting the flow of contaminant liquid to the medial chamber, prior to introduction of the backwash fluid under pressure, and the backwash fluid is drained from the upper end and medial chambers, prior to separation from the lower end chamber. The power means for separating the lower end chamber from the medial chamber in the disclosed embodiment includes an air cylinder and piston connected to either the upper end chamber section or the medial chamber section. In the second embodiment, a flexible gasket is provided between the medial chamber and the upper end chamber, sealing the fluid communication therebetween and permitting the medial chamber section to be raised relative to the upper chamber section to remove the disposable filter medium.

The method of operating the claimed invention includes the steps of introducing contaminant liquid between the upper and lower opposite faced, planar, horizontal filter media, simultaneously flowing liquid through the filter media to accrete contaminants on the opposed confronting faces of the filter media, substantially doubling the usable filter area, as described above. The upper filter medium is renewed by interrupting the flow of contaminant liquid and backwashing the filtrate liquid from the upper end chamber through both of the filter media under pressure. The upper chambers may be purged by introducing gas under pressure into the upper end chamber. The backwashing transfers the contaminants accreted on the upper filter media to the opposed face of the lower filter media. The final step is removing the lower filter media, with all of the contaminants.

Other advantages and meritorious features of the improved liquid filter apparatus of this invention will be apparent from the following description of the preferred embodiments, the appended claims and the drawings.

DESCRIPTION OF THE PREFERRED EMBODIMENTS

Figure 1:
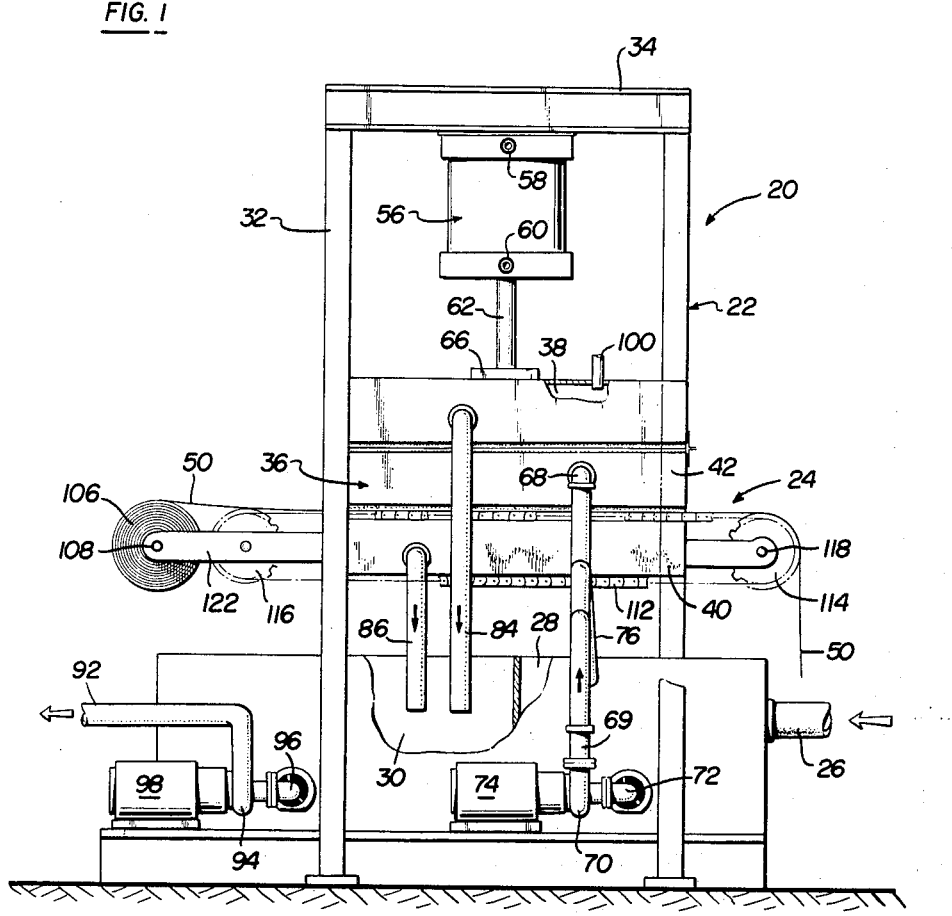
FIG. 1 is a side elevation of one embodiment of the liquid filter apparatus of this invention.
Figure 2:
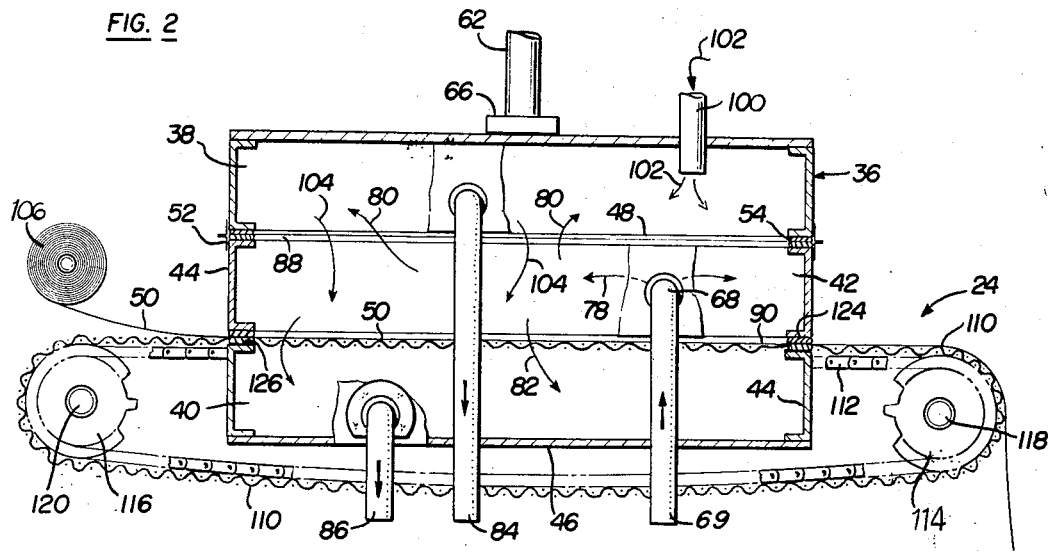
FIG. 2 is a partial cross-sectional side view of the filter apparatus shown in FIG. 1, showing the filter chambers and the conveyor.

The filter apparatus 20 shown in FIGS. 1 and 2 is supported on a suitable frame 22 and includes a conveyor 24 to remove the contaminants from the filter. Contaminated liquid is received through inlet 26 to the contaminant or dirty liquid tank 28. The clean filtrate liquid is received from the filter apparatus in the clean liquid tank 30.

The frame or supporting structure 22 may be of any suitable construction, such as the fabricated structure shown in FIG. 1 which includes four spaced vertical supports or standards 32 which are rigidly connected at their upper ends by cross members or channels 34. Additional cross members may also be provied, as needed.

The filtration of the contaminant liquid stored in tank 28 occurs in the container or casing 36 which is divided into three filter chambers, including an upper end chamber 38, a lower end chamber 40 and a medial inlet chamber 42 juxtaposed between the end chambers. As shown in FIG. 2, the filter chambers are constructed of a plurality of channel sections 44 which are closed by suitable end plates 46. The end plates may be welded or otherwise secured to the upper and lower channel sections defining the upper and lower filter chambers. A fixed permeable planar filter medium 48 is interposed between the upper and medial filter chambers and a second, preferably disposable, permeable planar filter medium 50 is disposed between the medial and lower filter chambers. The upper filter medium 48 may be characterized as a fixed filter, however the filter is preferably not permanently attached to the channel sections to permit removal, if required. The opposed channel sections are preferably clamped, as at 52, and a sealing means or gasket 54 is provided on opposite sides of the filter medium. A suitable clamping means is shown in my U.S. Pat. No. 2,969,148 referenced above. The upper filter medium 48 is preferably a finely textured medium, such as a closely woven fabric of plastic or wire mesh.

In the filter apparatus embodiment shown in FIGS. 1 and 2, the upper and medial filter chambers are separable from the lower filter chamber to permit removal of the filtrate contaminates after filtering. An air cylinder and piston 56 is provided in the disclosed embodiment which is secured at the upper end to the cross member 34. Any other suitable lift mechanism may also be utilized. The disclosed air cylinder includes an air inlet 58 and outlet 60 which extends and retracts the piston rod 62 and the lift mechanism would normally include a suitable control, not shown, to operate the cylinder. The piston rod 62 in the disclosed embodiment is secured to the end plate 46 of the upper filter chamber by a suitable plate or bracket 66 which may be welded or otherwise secured to the upper plate.

Contaminant liquid is supplied to the filter apparatus from the dirty liquid tank 28 through inlet pipe 69 to the medial filter chamber 42. A suitable control valve, such as a solenoid valve, will be provided at the inlet 68 to the medial chamber and the liquid is supplied to the medial chamber by a suitable pump 70, driven by electric motor 74. The outlet 72 of the dirty tank is provided with suitable sealing means and the pipe 69, in the disclosed embodiment, is provided with a flexible section 76, such as a rubber hose, to permit separation of the medial filter chamber from the lower filter chamber, as described hereinbelow.

As described above, the contaminant liquid to be filtered is pumped under pressure to the medial filter chamber through opening 68, as shown by arrows 78 in FIG. 2. The contaminant liquid then flows under pressure through the opposed filter media 48 and 50 as shown by arrows 80 and 82, respectively. The clean filtrate liquid is finally removed from the upper and lower end filter chambers through pipes 84 and 86, respectively. In the disclosed embodiment, the upper chamber outlet 84 includes a normally open solenoid valve, not shown, to control the flow of clean filtrate liquid from that chamber. This method of filtration simultaneously accretes contaminants on the lower surface 88 of the upper filter medium and the upper surface 90 of the lower filter medium, doubling the usable filter area of a planar filter, without substantially increasing the pressure vessel volume, which is defined by the overall container 36.

The clean filtrate is then pumped, as required, from the clean liquid tank 30, through pipe 92. A suitable pump 94 is provided to pump the filtrate liquid from the opening 96 in the clean tank which is powered by a suitable motor 98, such as a conventional electric motor.

As described above, any continuous filter apparatus requires periodic cleaning and renewal of the filter media. The disclosed apparatus and method of this invention is particularly adapted to simplify the cleaning of multiple filter media by utilizing the combination of a fixed planar filter medium, which is renewed by backwashing the liquid through the upper filter chamber, and a removable filter element which collects all of the contaminants during the backwash cycle. Backwash fluid is supplied to the upper filter chamber 38 through inlet 100 which includes a normally closed valve, such as a conventional solenoid valve, not shown. Any suitable fluid may be utilized, such as air under pressure. The control mechanism for the filtering apparatus disclosed in FIGS. 1 and 2 may include a pressure sensing switching mechanism, as disclosed in my above referenced U.S. patents, which automatically starts backwashing and renewal of the filters when the pressure drop across the filter elements increases beyond a predetermined limit, indicating that the filter media should be cleaned. The normally opened valves in the inlet 68 of the contaminant liquid to the media chamber and the outlet 84 of the upper chamber are then closed, forcing the liquid in the upper and medial chambers into the lower chamber 40 and out the outlet pipe 86 of the lower chamber. The backwash fluid flows under pressure from the inlet 100, as shown by arrow 102, through the upper filter medium, as shown by arrow 104, through the lower filter medium, as shown by arrow 82 and finally out the outlet pipe 86 into the clean liquid tank 30.

The contaminants accreted during filtering on the lower surface 88 of the upper filter medium 48 are removed by the flow of backwash liquid from the upper chamber and the contaminants are redeposited on the upper surface 90 of the lower filter medium 50. The upper filter medium is thus renewed and all of the filtrate contaminants may be removed from the filtering apparatus with the lower filter medium. It will be understood that after repeated backwashings, it may be necessary to mechanically clean the upper filter element, which is accomplished by removing the clamps 52 and separating the upper and medial filter chambers.

In the preferred embodiment of the filter apparatus of this invention, the lower filter medium 50 is a replaceable sheet of filter paper or the like which is supported on a continuous conveyor 24, such as disclosed in my U.S. Pat. No. 2,969,148. Certain details of the conveyor system which are not described herein may be found in this patent.

In the disclosed embodiment, the lower filter medium 50 is supplied to the filter apparatus from a roll of filter paper 106, or the like, which is suitably supported for rotation on an axle 108, as shown in FIG. 1. The replaceable filter medium 50 is supported within the filter chamber on a pervious continuous belt 110, as best shown in FIG. 2. The conveyor belt is preferably an endless belt which is supported upon and secured to a pair of chains 112 which are mounted for rotation on sprockets or spools 114 and 116. In the embodiment disclosed in my above referenced U.S. Pat. No. 2,969,148, the continuous belt is supported on the chain by a plurality of mounting members, not shown. In the disclosed embodiment, shaft 118 is the drive shaft, which rotates sprockets 114 and 116 by movement of the drive chain 112. The sprockets 114 and 116 and the roll of filter paper 106 are supported in the disclosed embodiment on a horizontal beam 122. The lower filter medium 50 may thus be disposed into and out of the filter chamber or container 36 by moving the continuous belt around the sprockets 114 and 116, from left to right in FIGS. 1 and 2.

After backwashing of the filter chambers, as described above, all of the contaminants removed from the contaminant liquid are deposited on the replaceable lower filter medium 50. The contaminants are then removed by separating the medial filter chamber from the lower filter chamber and rotating the continuous belt 110 to remove the lower filter medium from the apparatus, as shown at the right of FIG. 1. In the embodiment disclosed in FIGS. 1 and 2, the upper and medial filter chambers 38 and 42, respectively, are relatively fixed and the cylinder 56 is secured to the upper plate 46 of the upper filter chamber. In operation, the piston rod 62 of the cylinder is retracted, jointly raising the upper and medial filter chambers, relative to the lower chamber 40. The power means, not shown, connected to the drive shaft 118 is then actuated, rotating the sprockets 114 and 116 and the continuous belt 110 supporting the replaceable filter medium 50. Gaskets 124 and 126 are provided between the channel sections 44 defining the upper filter chamber 42 and the lower filter chamber 40 to reseal the fluid communication between these chambers. After replacement of the lower filter medium 50, the piston rod 62 is extended to close the communication between the medial fluid chamber and the lower fluid chamber and the apparatus is ready again for filtering.

Figure 3:
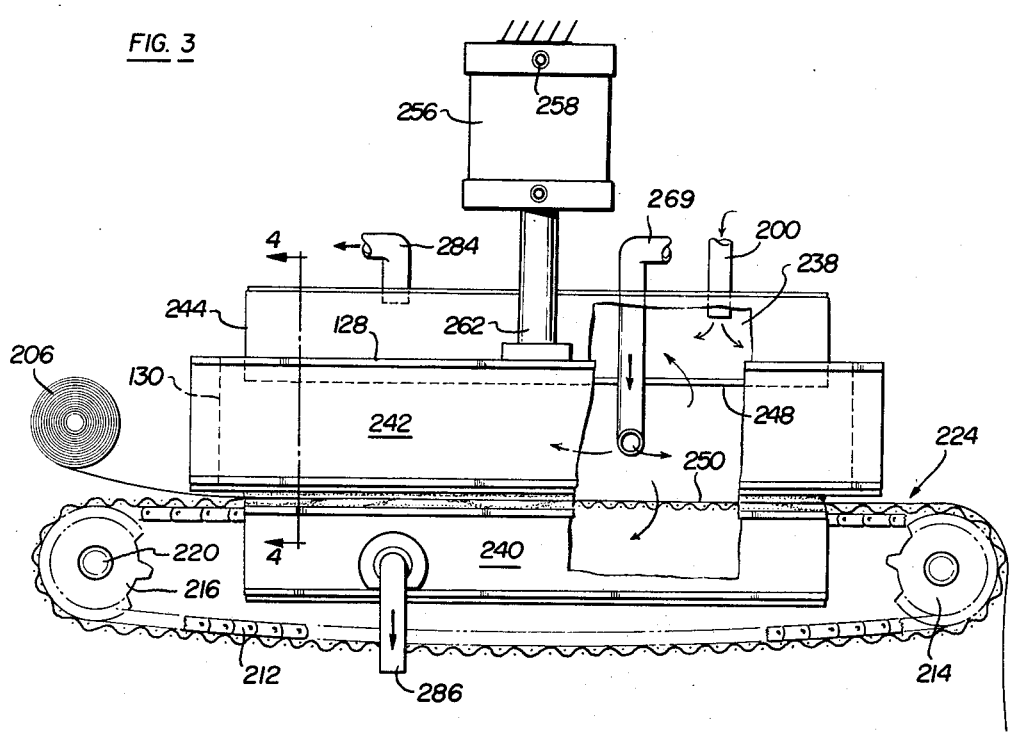
FIG. 3 is a partial side elevation of another embodiment of the filter apparatus of this invention.
Figure 4:
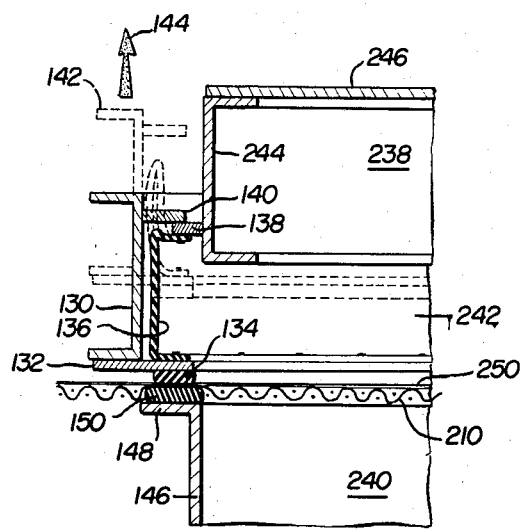
FIG. 4 is a partial cross-sectional view of the apparatus shown in FIG. 3, in the direction of view arrows 4—4.

The embodiment of the filter apparatus shown in FIGS. 3 and 4 operate substantially identical to the filter apparatus shown in FIGS. 1 and 2, except that the upper filter chamber 238 is fixed relative to the supporting structure and the piston rod 262 of the cylinder 256 is connected to the upper plate 128 of the medial filter chamber. Similar elements of the filter apparatus disclosed in FIGS. 3 and 4 are numbered in the same sequence as the elements disclosed in FIGS. 1 and 2, in the 200 series. The unnumbered elements may be identical to the structure shown in FIGS. 1 and 2.

In the disclosed embodiment of the apparatus, the medial chamber is defined by a channel section 130 which opens outwardly, as shown in FIG. 4. The channel section 130 is secured to a lower plate 132, as by welding, and the fluid communication between the lower plate 132 and the replaceable filter medium 250 is provided by a sealing gasket 150. The fluid communication between the medial filter chamber 242 and the upper end filter chamber 238 is provided by a flexible gasket 136 which is secured at one end to the lower plate 132 of the medial chamber and at its upper end to a stop 138 secured to the upper chamber channel 244. The gasket 136 may be secured to the plate 132 and the stop 138 by any suitable means, including bolts or the like. The channel 130 also includes a stop 140 which prevents overtravel of the channel 130 during extension of the cylinder rod 262. When the medial filter chamber is raised by the cylinder 256, as shown by the arrow 144, the channel 130 is located in the position shown in phantom at 142 in FIG. 4. In the raised position, the lower plate 132 of the medial filter chamber is separated from the channel 146 defining the lower filter chamber 140, permitting replacement of the lower filter medium 250 as described above. The channel 146 includes an outer flange 148 to which is secured the lower sealing gasket 150 to seal the communication between the lower filter chamber and the medial filter chamber upon lowering of the channel 130.

Except for the modifications described above, the filter apparatus shown in FIGS. 3 and 4 operates in the same manner as the apparatus shown in FIGS. 1 and 2. Contaminant filtrate liquid is received in the medial filter chamber 242, under pressure, through pipe 269. The contaminant liquid is then filtered simultaneously through the opposed planar filter media 248 and 250 and the clean filtrate liquid is returned to the clean tank through outlets 284 and 286. The upper fixed filter media may be secured to the bottom of the upper filter chamber by any suitable means. The filter media are renewed by backwashing the fluid chambers, under pressure, through purge inlet 200 after closing the valves associated with inlet 269 and outlet 284. The contaminants accreted on the opposed confronting faces of the filter elements 248 and 250 are removed by first washing the upper filter with the backwash fluid, redepositing the contaminants from the upper filter on the lower filter and removing the lower filter as described above.

The method of this invention will be described first in regard to the embodiment of the filter apparatus shown in FIGS. 1 and 2. The method includes the steps of introducing contaminated liquid between the upper and lower opposite faced, planar, horizontal filter media 48 and 50, respectively, simultaneously flowing liquid through the filter media to accrete contaminants on the opposed confronting faces 88 and 90 of the filter media. The filters are renewed by interrupting the flow of contaminant liquid through opening 68, backwashing fluid through the upper filter media 48 by introducing fluid under pressure through the purge inlet 100 which transfers the contaminants accreted on the upper fluid media surface 88 to the opposed surface 90 of the lower filter media. Finally, the lower filter media 50 is removed from the filter chamber by separating the medial filter chamber 42 from the lower chamber 40 and rotating the continuous belt 110 which replaces the disposable filter 50 from the roll 106.

In the embodiment disclosed in FIGS. 1 and 2, the upper and medial filter chambers are displaced from the lower filter chamber 40 by retracting the piston rod 62. In the embodiment disclosed in FIGS. 3 and 4, the piston rod 262 is connected directly to the upper plate 128 of the medial chamber. In this embodiment, the medial chamber is moved relative to the upper and lower end chambers, which may be fixed by any suitable means to the supporting structure or standard.

As stated hereinabove, reference may be made to my above referenced U.S. patents for details of the filtering apparatus which are not disclosed herein. For example, U.S. Pat. No. 2,969,148 disclosed details of the control system for the backwash and conveyor system which are not disclosed herein and U.S. Pat. No. 2,867,326 discloses a planar filter apparatus including a suitable lift mechanism and control.

What is claimed is:

1. A filler apparatus for removing contaminants from liquid, comprising: a frame supporting a filter assembly having three vertically superimposed filter chambers; the upper chamber defined in part by an upper and side walls; the medial chamber defined in part by side walls; and the lower chamber defined in part by a lower and side walls; a fixed, substantially planar, horizontal, renewable liquid permeable filter medium releaseably secured between said upper and medial chambers defining the lower boundary of the upper chamber and the upper boundary of the medial chamber and enclosing the upper chamber; said upper and medial chambers sealingly attached to prevent escape of liquid; a supply of movable filter medium exterior to said filter chambers, a portion of said movable filter medium interposed between the side walls of said medial and lower chambers defining the lower boundary of said medial chamber and the upper boundary of said lower chamber and enclosing said medial and lower chambers; said movable medium portion supported within the filter assembly on a liquid pervious belt surface; a liquid inlet conduit connected to one of the side walls of and communicating with the medial chamber for delivering contaminated liquid to said medial chamber; a conduit outlet connected to and communicating with each of the upper and lower chambers, respectively, such that portions of contaminated fluid delivered to said medial chamber by said liquid inlet flow through the fixed filter and said movable medium portion, said flow depositing contaminants on the opposed faces of said fixed and movable filter medium to achieve a filtered liquid flowing through the upper and lower chambers and into the respective outlets; a backwash inlet conduit means connected to and communicating with said upper chamber, said means operative after terminating introduction of contaminated fluid to said apparatus for: (1) introducing a backwash fluid into said upper chamber, (2) causing said fluid to flow through said fixed filter medium, said medial chamber and said movable filter medium and into said lower chamber, and (3) transferring substantially all of the contaminants collected on said fixed filter medium to the opposed face of said movable medium portion; power means connected to said frame and filter assembly for separating said medial chamber side walls and said lower chamber after termination of the backwash cycle in order to expose said movable medium portion for removal from the filter assembly so that a new portion of the filter supply may be positioned within the filter assembly for further contaminated liquid filtration; said belt surface connected to a drive means, said drive means (1) moving said belt relative to the filter assembly, (2) displacing the portion of said movable filter and the accummulated contaminants from both filter media, and (3) replacing said contaminated portion with a clean portion of said movable filter supply; said power means returning said medial chamber side walls and said lower chamber to the non-separated filtration position after the contaminated portion of said movable filter medium has been replaced, so that filtration flow through said liquid inlet conduit in said medial chamber may resume; whereby the opposed and parallel filter media provide dual filter areas to increase the usable filter area within the inlet medial chamber, and the single movable filter medium in combination with the backwash cycle obviates the necessity of replacing said fixed filter after each filtration cycle.

2. The filter apparatus defined in claim 1, characterized in that said power means includes a cylinder connected to said frame and a piston rod movable within said cylinder and connected to the upper wall of said upper chamber; said upper and medial chamber walls being releaseably clamped together to secure said fixed filter medium therebetween; such that movement of said piston effects simultaneous movement of said upper and medial chambers to expose said movable filter medium portion.

3. The filter apparatus defined in claim 1, characterized in that said power means includes a cylinder connected to the frame and a piston rod movable within said cylinder and connected to said medial chamber side walls; said medial chamber further including a flexible gasket secured at its opposed ends to the side walls of said upper and medial chambers, respectively, to provide a fluid seal between said upper and medial chambers, said upper and lower chambers being fixed relative to each other.

References Cited
UNITED STATES PATENTS

| | | | |
|---|---|---|---|
| 2,969,148 | 1/1961 | Hirs | 210—138 X |
| 3,335,862 | 8/1967 | Hirs | 210—387 |
| 2,867,326 | 1/1959 | Hirs | 210—104 |

SAMIH N. ZAHARNA, Primary Examiner

R. G. MUKAI, Assistant Examiner

U.S. Cl. X.R.

210—314, 387